US005459364A

United States Patent [19]

Rondier

[11] Patent Number: 5,459,364

[45] Date of Patent: Oct. 17, 1995

[54] SLIP RING UNIT FOR FITTING TO AN ALTERNATOR, ESPECIALLY FOR A MOTOR VEHICLE

[75] Inventor: Patrick Rondier, Montmagny, France

[73] Assignee: Valeo Equipments Electriques Moteur, Creteil, France

[21] Appl. No.: 304,493

[22] Filed: Sep. 12, 1994

[30] Foreign Application Priority Data

Sep. 16, 1993 [FR] France .................................. 93 11043

[51] Int. Cl.[6] .................................................. H02K 13/00

[52] U.S. Cl. ............................ 310/232; 310/42; 310/235

[58] Field of Search .................................... 310/232, 239, 310/219, 42, 43, 235; 29/597

[56] References Cited

U.S. PATENT DOCUMENTS

| | | | |
|---|---|---|---|
| 2,671,865 | 3/1954 | Nippert | 29/597 U X |
| 4,618,793 | 10/1986 | Shizuka et al. . | |
| 5,325,003 | 6/1994 | Saval et al. | 310/43 |

FOREIGN PATENT DOCUMENTS

| | | |
|---|---|---|
| 0094163 | 11/1983 | European Pat. Off. . |
| 3510489 | 10/1985 | Germany . |

*Primary Examiner*—R. Skudy

*Attorney, Agent, or Firm*—Morgan & Finnegan

[57] ABSTRACT

A slip ring unit arranged to be force-fitted on to an alternator shaft, especially a motor vehicle alternator shaft, is made by moulding insulating material over electrically conductive elements so as to encapsulate the latter. It has a generally cylindrical body which includes two slip rings at its outer surface, the slip rings being connected to two electrical connecting elements for connecting the slip ring unit to the ends of winding wires of the alternator. The body of the unit has a bore for accommodating the alternator shaft. The insulating material is extended beyond one of the two slip rings, to define a collar at that end of the unit on which the fitting force is to be applied. At least one notch is formed in the extension constituted by the collar, these notches extending through the whole axial thickness of the latter so as to leave one side of the adjacent slip ring exposed. The applied fitting force can then be exerted directly on the slip ring, through the notch.

7 Claims, 4 Drawing Sheets

SLIP RING UNIT FOR FITTING TO AN ALTERNATOR, ESPECIALLY FOR A MOTOR VEHICLE

FIELD OF THE INVENTION

The present invention relates to general terms to alternators, and in particular to alternators for motor vehicles. More particularly, it is concerned with slip ring or collector units for connection with the excitation winding of such an alternator.

BACKGROUND OF THE INVENTION

It is conventional during the manufacture of an alternator to form the slip rings directly on a projecting part of the alternator shaft.

Another known technique consists in making the slip ring unit, or collector, as a separate component, using for example a method whereby the body of the component is moulded on to its electrically conductive parts. The slip ring unit is subsequently fitted on to the shaft of the alternator, typically by force fitting.

Such a slip ring unit, formed in the known way as a separate component, comprises a generally cylindrical first body portion which includes two slip rings at its outer surface, together with electrical connecting elements for connecting the slip rings with the ends of wires of a winding of the alternator.

It is also known to provide such a slip ring unit or collector which includes, on the side of the body (i.e. at the end of the slip ring unit) on which the fitting force is to be applied, an extension of the insulating material which extends over a short axial distance, so as to provide satisfactory location of the adjacent slip ring in the axial direction. Thus, when the slip ring unit is being fitted on to the alternator shaft, the applied force is exerted on this extension of the insulating material. Since the applied force is necessarily large, there is a substantial danger of damage or fracture of the insulating material in this region, which is of course highly undesirable.

A first object of the present invention is to overcome this drawback.

In addition, in cases where the separate slip ring unit has a symmetry of revolution over 180°, with, in particular, two diametrically opposed wire end connecting elements, the orientation of the slip ring unit in one or other of the two possible angular positions does not, in general, matter. However, this orientation determines which end, i.e. the outer end or the inner end, of the excitation winding of the alternator will be connected to which slip ring (outer or inner) of the alternator. It has been found, unexpectedly, that the two possible ways of making this connection affect in different ways the behavior of the alternator as regards electromagnetic perturbations, especially in radio frequency wavebands.

DISCUSSION OF THE INVENTION

Accordingly, the present invention proposes an arrangement in which a slip ring unit, to be force-fitted on an alternator shaft and having a general symmetry of revolution over 180°, is able to adopt one particular orientation selected from the two possible orientations, so as to match the connection between the two wire ends of the alternator winding to the two slip rings in the slip ring unit, in such a way as to minimize the above mentioned perturbations.

According to the invention in a first aspect, a slip ring unit adapted to be force-fitted on an alternator shaft, especially for a motor vehicle alternator, the slip ring unit being of the type made by moulding insulating material over electrically conductive elements so as to encapsulate the latter, and comprising a generally cylindrical body having two slip rings at its outer surface, the slip rings being connected to two connecting elements for electrical connection with the wire ends of wires of a winding of the alternator, the body having a bore for receiving the shaft, and an extension of the insulating material extending beyond one of the two slip rings on the side of the body on which an applied fitting force is to be exerted, is characterised in that at least one notch is formed in the extension through the whole axial thickness of the latter, leaving a surface portion of the adjacent slip ring exposed, so that the applied fitting force can be exerted directly on the slip ring through the said at least one notch.

According to a preferred feature of the invention, at least two said notches are formed through the whole axial thickness of the extension, and the notches are disposed with an asymmetry of revolution over 180°, in such a way as to take the place of jigs for the angular positioning of the slip ring unit in one of two possible positions which are themselves offset by 180° with respect to each other.

According to another preferred feature of the invention, the slip ring unit has three said notches, spaced apart angularly circumferentially by 120°.

According to a further preferred feature of the invention, two diametrically opposed spline grooves are formed in the said bore, and one of the notches is aligned circumferentially with one of the said spline grooves.

Preferably, the or each said notch is formed through the whole radial width of the said extension.

According to the invention in a second aspect, an alternator, especially for a motor vehicle, a characterised in that a slip ring unit according to the invention in its first aspect is fitted on a projecting shaft of the alternator.

Further aspects, objects and advantages of the present invention will appear more clearly on a reading of the detailed description of a preferred embodiment of the invention which follows, and which is given by way of non-limiting example only and with reference to the accompanying drawings.

Figure 2A:
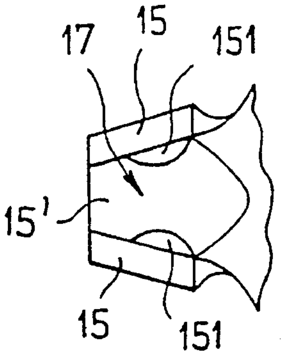
FIG. 2 is an end view seen in the direction of the arrow II in FIG. 1.
Figure 2:
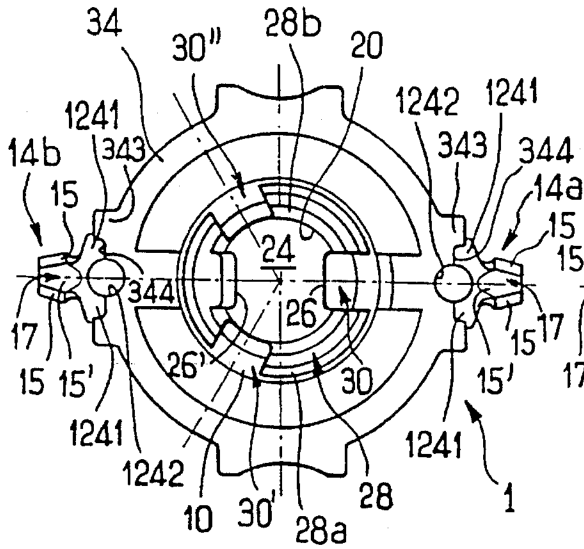

FIG. **2*a* is a view on a larger scale, showing part of FIG. 2**.

Figure 1:
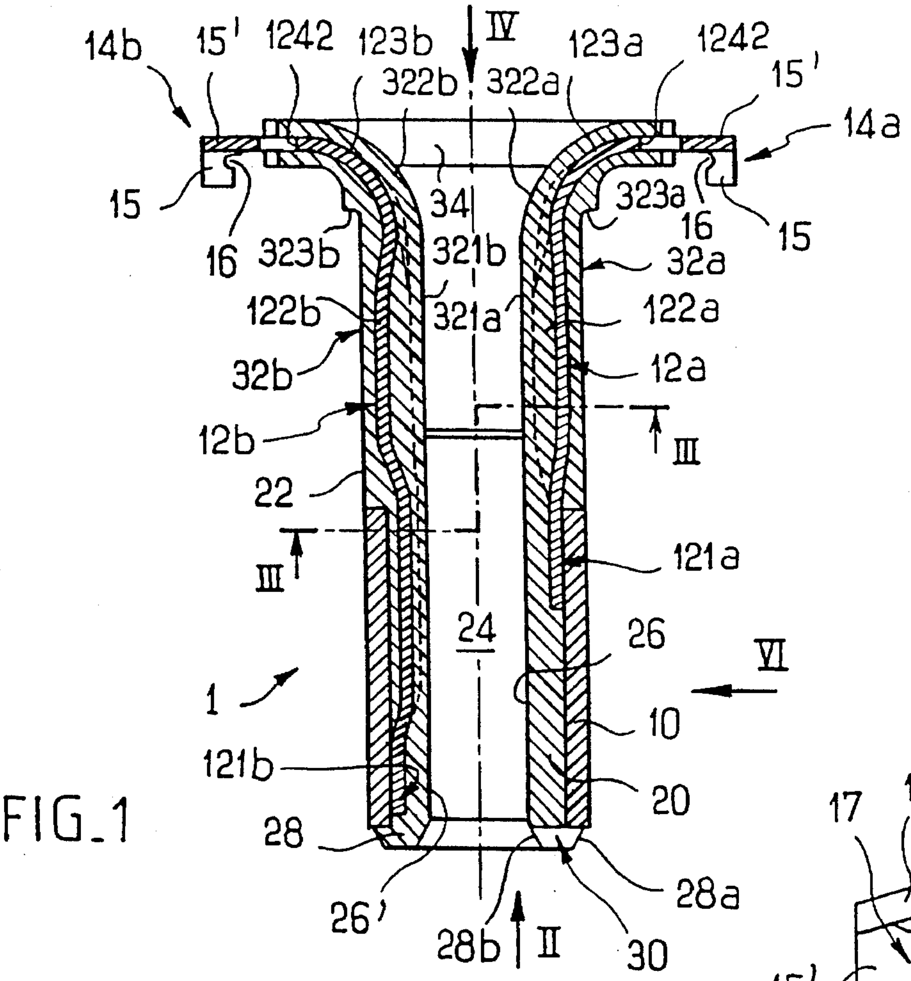
FIG. 1 is a view in axial cross section taken on the line I—I in FIG. 4,showing a member which is adapted to constitute a collector or slip ring unit for an alternator in accordance with the invention.
Figure 3:
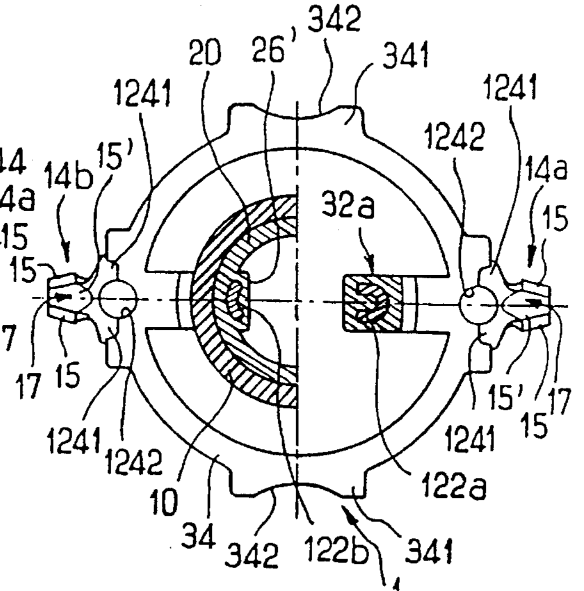

FIG. 3 is a view in transverse cross section taken on the line III—III in FIG. 1.

Figure 4:
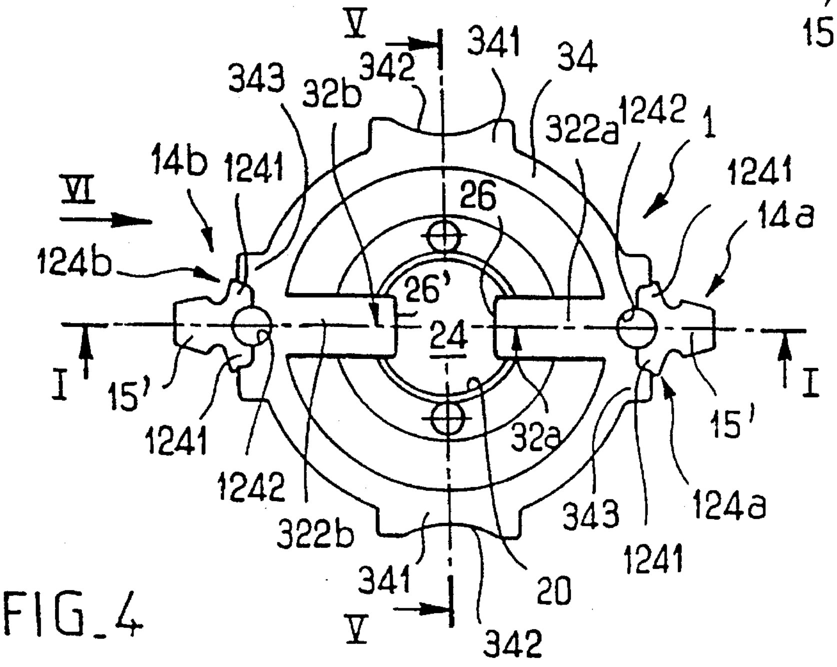

FIG. 4 is an end view in the direction of the arrow IV in FIG. 1.

Figure 5:
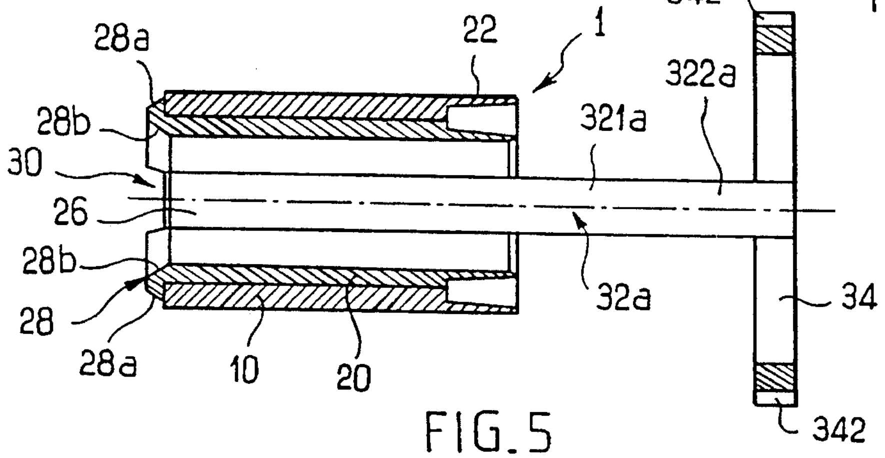

FIG. 5 is a view in axial cross section taken on the line V—V in FIG. 4.

Figure 6:
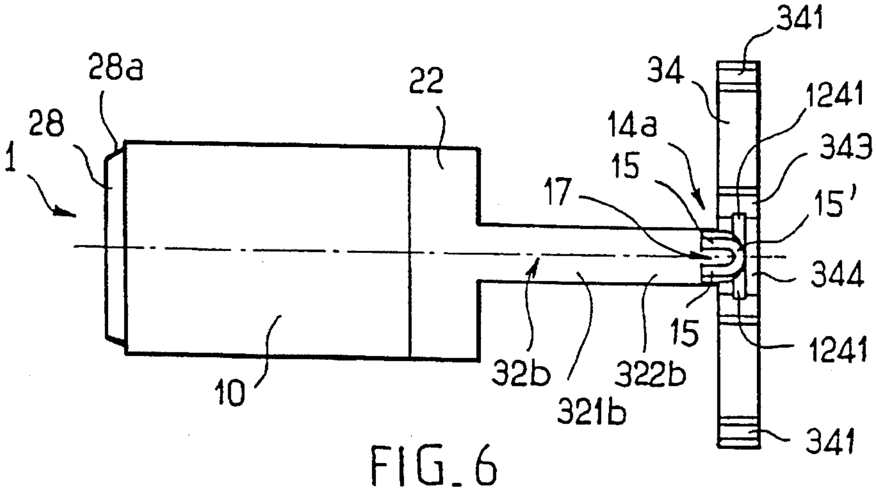

FIG. 6 is a view in elevation in the direction of the arrow VI in FIG. 4.

Figure 7:
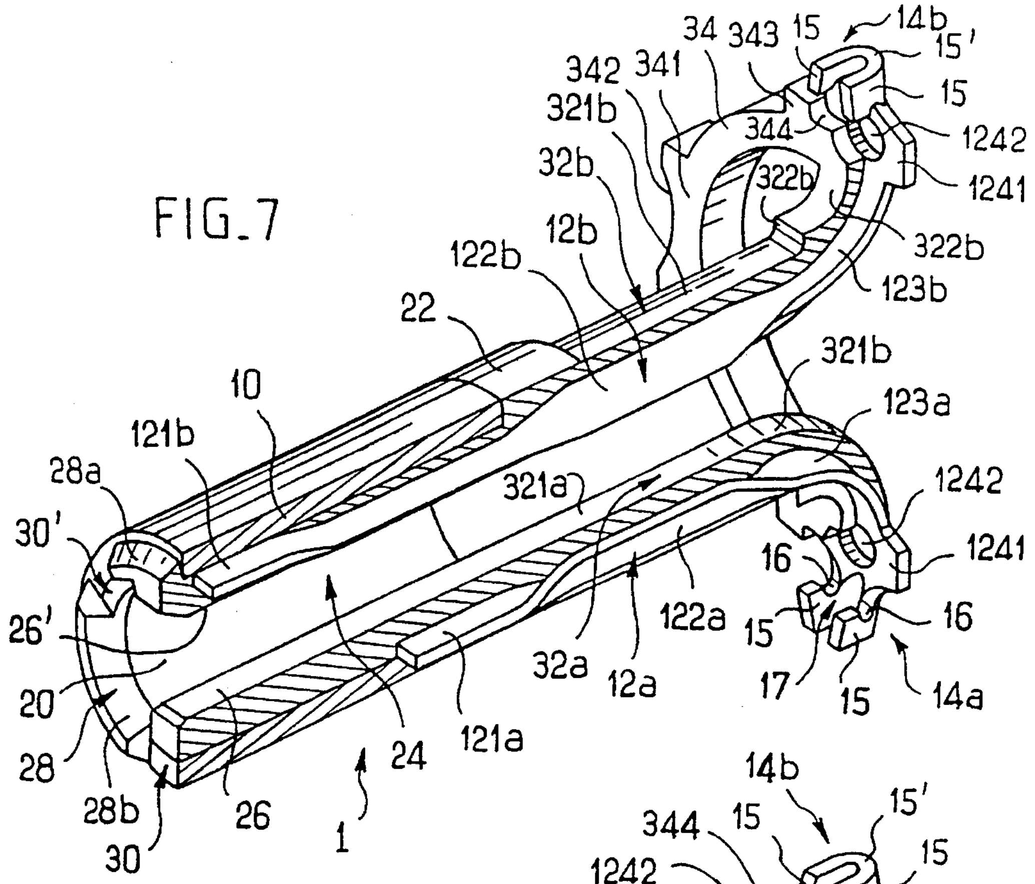

FIG. 7 is a perspective view, partly cut away, of the slip ring unit seen in FIGS. 1 to 6.

Figure 8:
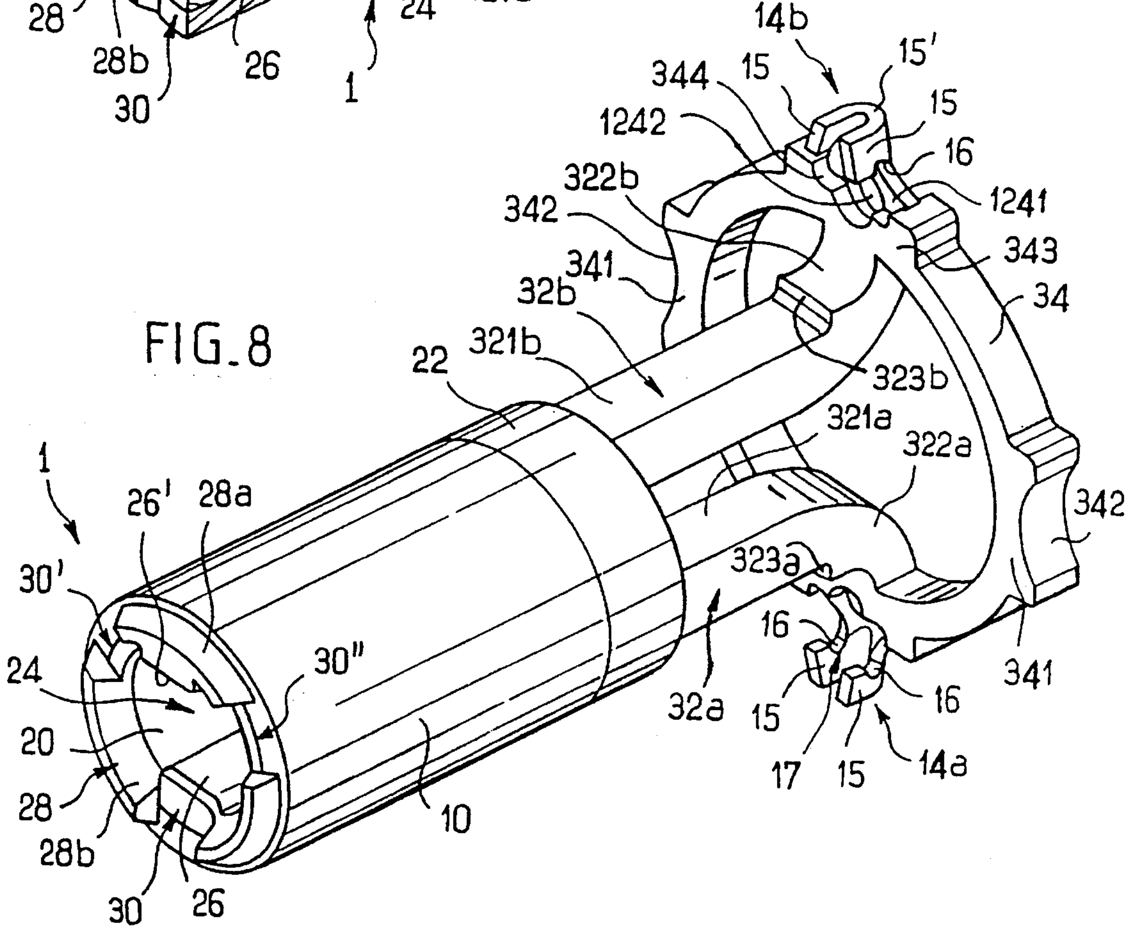

FIG. 8 is a perspective outside view of the slip ring unit shown in FIGS. 1 to 7.

Figure 9:
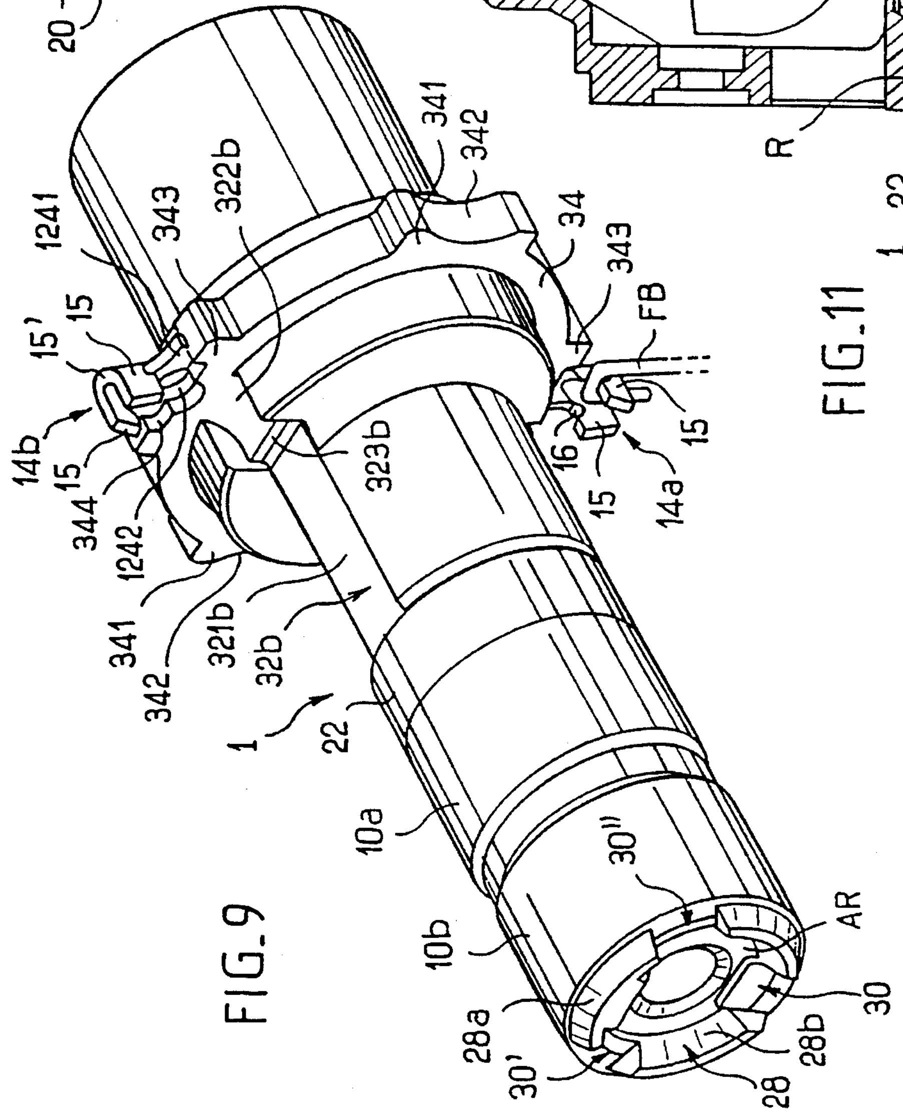

FIG. 9 is a perspective view of the slip ring unit shown in FIGS. 1 to 8, when connected and mounted on an alternator.

Figure 10:
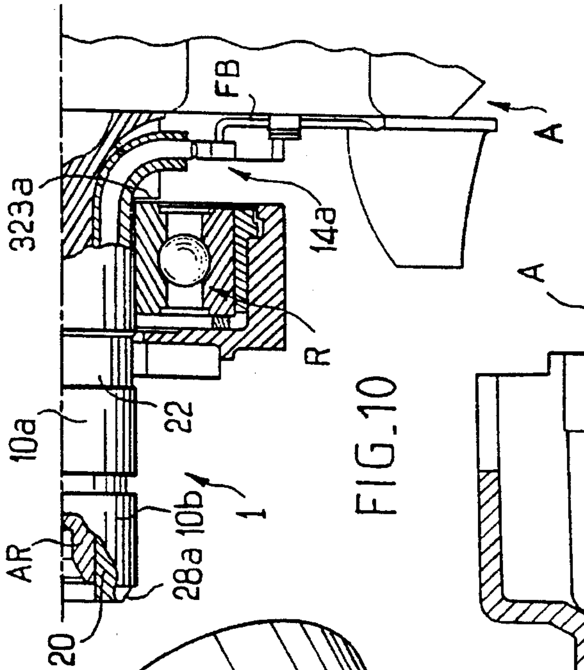

FIG. 10 is a view in vertical axial cross section of part of a first type of alternator equipped with the slip ring unit shown in FIGS. 1 to 8.

Figure 11:
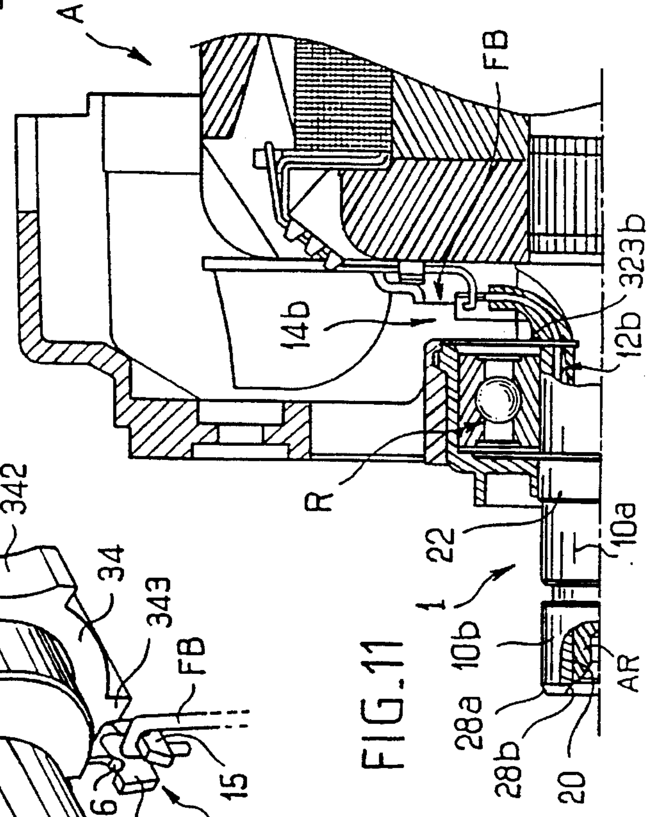

FIG. 11 is a view in vertical axial cross section showing part of a second type of alternator equipped with the slip ring unit shown in FIGS. 1 to 8.

DESCRIPTION OF A PREFERRED EMBODIMENT OF THE INVENTION

Reference will first be made to FIGS. 1 to 8, in which a component which constitutes a collector or slip ring unit for an alternator is shown in an intermediate step in its manufacture.

The slip ring unit is generally indicated at 1, and is made by moulding a suitable plastics material, preferably of a thermosetting type, on to electrically conductive elements, which are made of copper, for example. These latter consist, firstly, of two cylindrical slip rings for contact with brushes in the usual way, secondly, two electrical connecting elements for connection with two ends of a motor winding of the alternator, and thirdly, two electrical linking elements for connection between the two slip rings and the two connecting elements.

In the conventional way, the cylindrical slip rings are initially in the form of a single hollow copper cylinder 10 which, at the end of the manufacturing process of the slip ring unit, is divided circularly over its whole thickness in its middle region so as to form two slip rings 10*a* and 10*b*, which are electrically insulated from each other as is best seen in FIG. 9.

The above mentioned connecting elements are indicated respectively at 14*a* and 14*b* in various Figures of the drawings. They comprise two lugs 15 in face to face relationship, which define between them a flared central channel 17 (see for example FIG. 6). The lugs 15 are connected together through a portion 15' which has the form of a sector of a frustum of a cone and which defines the base of the channel 17. The latter is arranged to receive one end of the winding. Each of the associated electrical linking elements, indicated in FIG. 1 at 12*a* and 12*b* respectively, extends radially inwardly from the narrowest side of the associated lug 15.

Each lug 15 has a slot in the region of the base of the channel 17, formed on the edge of the lug which is directed radially inwardly, and in this example this slot 16 is semicircular. In addition, and as is best seen in FIG. 2*a*, each lug 15 has a generally rounded boss 151 on its inner face, this boss being preferably made by press forming. Its purpose will be explained later on.

FIG. 9 shows the end (or "wire end") of a winding wire FB, which has been fitted in the connecting element 14*a*. In this example the slip ring unit 1 is in an angular position such that the two connecting elements 14*a* and 14*b* are aligned vertically. The wire end is bent through 180°, and the downwardly directed free terminal wire portion of the wire end is engaged in the channel defined between the lugs 15, while its intermediate portion comprising the 180° bend, is lodged in one of the slots 16. Using a suitable tool, the two lugs are subsequently pressed towards each other, so that they then grip the free wire portion of the wire end. This step is followed by soldering, which is carried out for example electrically. It will be observed that, in the context of an automated operation to make this connection, the presence of the bosses 151 enables the degree of gripping of the wire to be easily detected, so that it is adequate to enable the subsequent operation of electric welding to be carried out satisfactorily. More precisely, the bosses 151 enable any cutting of the wire by the sharp edges of the lugs 15 to be avoided during the gripping operation.

The construction of the connecting element, such as the element 14*a*, has a number of advantages. First of all, the flared shape of the channel 17 which is delimited by the lugs 15 and the base 15' exerts a guiding force during the introduction of the free end of the wire. This flared shape also enables any undue squeezing effect, during the bending of the lugs 15 so as to effect the gripping action, to be avoided due to the fact that the channel 17 has its greatest width at the level of the junction between the element 14*a* or 14*b* with the remainder of the metallic component.

Subsequently, before gripping by the lugs 15 takes effect, the slot 16 which receives the bent portion of the wire ensures that the wire is stabilised in the position shown in FIG. 9, so as in particular to prevent the latter from separating from the channel through the open side of the latter.

Finally, the lugs 15 ensures firm gripping, but not cutting or nicking, of the wire, so ensuring good mechanical retention before the soldering step.

It should be noted here that a wire gripping element such as that described above also finds application in fields other than that between a slip ring unit and a winding of an alternator.

Each of the linking elements 12*a* and 12*b* has a portion in the form of part of a cylinder, indicated at 121*a* and 121*b* respectively in FIG. 1. This cylindrical portion is welded on to the internal face of the portion 10 which is adapted to constitute the slip rings. In addition, each linking element 12*a*, 12*b* has a generally straight intermediate portion 122*a*, 122*b* respectively, and a second intermediate portion of flat cross section, indicated at 123*a* and 123*b* respectively. The cross section of each first intermediate portion 122*a*, 122*b* is U-shaped, at least over a substantial portion of its length, as can be seen in particular in the right hand part of FIG. 3 and in FIG. 7, this portion being offset radially inwardly with respect to the respective associated portion 121*a* or 121*b*. The flat second intermediate portion 123*a*, 123*b* is bent over an angle of about 90°, and that one of its ends which is oriented radially is extended into the respective connecting element 14*a* or 14*b*. The variations in profile of the portions 121*a*, 123*a*, and 121*b*, 123*b*, occur progressively.

It will be noticed here that the portions 121*a* and 121*b* are welded to the portion 10 respectively in the region of the latter which is close to the linking elements 12*a* and 12*b*, and in its region remote from these latter, in such a way that after the portion 10 has been divided as mentioned above, the connecting element 14*a* is only connected to the slip ring 10*a*, while the connecting element 14*b* is only connected to the slip ring 10*b*.

It will also be noted that the U-shaped cross section of the straight intermediate portions enables the rigidity of these latter to be increased, in order to minimize any danger of accidental departure from their correct positions during the moulding stage, and in particular in order to avoid any risk of a short circuit between the portion of the cylinder 10 which is to become the inner slip ring 10*a* and the adjacent intermediate portion 122*b*.

It will be observed in addition that each curved intermediate portion 123*a*, 123*b* includes, in the vicinity of the respective connecting element 14*a* or 14*b*, a wider region indicated at 124*a* and 124*b* respectively (see FIG. 4). These wider regions define two lateral anchor lugs 1241. A circular through hole 1242 is formed in these anchor lugs. This hole is arranged to cooperate with fixed or movable means in the mould, in such a way as to give precise positioning of the connecting elements 14*a* and 14*b* during the moulding step.

The body of plastics material formed in the step of moulding them on to the above mentioned conductive parts of the slip ring unit will now be described. First of all there is a generally cylindrical body portion 20 which extends within the copper cylinder 10, completely covering its inner face and also the conductive pads 121*a*, 121*b* and the parts of the intermediate portions 122*a* and 122*b* that lie within the cylindrical portion 20. The latter is extended towards the connecting elements 14*a* and 14*b* by another cylindrical body portion 22, the outer surface of which is flush with the outer surface of the copper cylinder 10.

The two cylindrical body portions 20 and 22 together define a central cylindrical bore 24, which has two grooves of generally rectangular cross section, 26, 26' extending along its entire length. These grooves are diametrically opposed to each other, and occupy the same angular postions with respect to the axis of the slip ring unit as the connecting elements 14*a* and 14*b*. This grooved bore is designed to receive a shaft of the alternator, having a complementary shape, so that the slip ring unit 1, which is force-fitted on the alternator shaft, is splined to the latter.

On the side opposed to the cylindrical body portion 22, the cylindrical body portion 20 is extended by a small collar 28 which has chamfered outer and inner edges indicated at 28*a* and 28*b* respectively. Three notches 30, 30' and 30" a reformed in the collar 28 as shown in FIG. 2. The depth of these notches is equal to the length of the collar 28 in the axial direction, that is to say the base of each notch leaves the edge of the copper cylinder 10 exposed.

The notch 30 is aligned on the lower spline groove 26, while the other two notches 30' and 30" are offset angularly, in this example by 120°, on either side of the notch 30.

It will be understood that the copper cylinder 10 is firmly trapped in the axial direction between the portions 22 and 28 of the plastics body.

The notches 30, 30' and 30" have a double function. Firstly, the force-fitting of the shipping unit or component 1 on to the alternator shaft is carried out, typically in an automated process, by exerting a very large axial force on the component 1 from the same side as the collar 28. The three notches 30, 30' and 30" are arranged to receive three pressure fingers of the automatic machine, which then exerts the axial force on the component by engaging not on the body of plastics material, but on that edge of the metallic cylinder 10 which is directed towards the collar 28. As a result, this force is applied without any danger of damage to the plastics body material of the slip ring unit, the mechanical strength of which is of course substantially smaller than that of the copper.

In addition, the three notches enable the angular position of the slip ring unit 1 on the alternator to be maintained before it is force-fitted on to the latter.

It will be noted here that the two ends of the rotor winding of the alternator correspond respectively to the inner side of the winding ("current entry side") and to an outer side of the winding ("current exit side"). In the prior art, one of these wire ends was connected indiscriminately to one of the slip rings 10*a* or 10*b*, while the other wire end was connected to the other slip ring.

It has however been found that the behavior of the alternator in the presence of electromagnetic perturbations, for example radiated by radio emissions, and more particularly in the frequency modulation wave band, is influenced to a significant extent by the way in which the ends of the excitation winding are connected to the potentials supplied by the regulator circuit of the alternator. In the arrangement shown in the drawings, the arrangement is such that the inner end of the winding (i.e. that which is closer to the alternator shaft, corresponding to the beginning of the winding during its formation) is connected to that terminal of the regulator which delivers a fixed potential corresponding to a predetermined one of the slip rings 10*a* and 10*b;* while the terminal of the regulator that delivers the variable potential corresponding to the other slip ring of the collector, will be connected to the outer end of the winding (i.e. the final end of the winding).

The notches 30, 30' and 30" enable these connections to be made in pairs, with the correct angular position of the slip ring unit 1, selected from its two possible positions offset by 180°, being determined for example by one or more feelers associated with the automatic assembly equipment, or again visually during manual operations.

After the moulding operation has been completed, the body of the slip ring unit 1 has two branches of plastics material, indicated at 32*a* and 32*b* in FIG. 1. The conductive linking portions 122*a*, 123*a* and 122*b*, 123*b* respectively are completely encapsulated in these two branches. The unit 1 also includes a ring-shaped portion 24 having an axis coincident with that of the cylindrical portions 10, 20 and 22, being connected to these latter portions through the branches 32*a* and 32*b* and lying at the level of the connecting elements 14*a* and 14*b*. More precisely, each branch 32*a*, 32*b* comprises a straight portion, 321*a*, 321*b* respectively, and a portion 322*a*, 322*b* respectively, curved through 90° and following the shape of the curved intermediate portions 123*a* and 123*b* of conductive material. The branches 32*a* and 32*b* are joined radially, and in positions diametrically opposed to each other, to the rig portion 34 at the level of the connecting elements 14*a* and 14*b*.

It will be observed that each branch 32*a*, 32*b* is formed with an outward shoulder, indicated at 323*a* and 323*b* respectively, in the transition region between its straight portion and its curved portion.

The inner face of each straight portion 321*a*, 321*b* constitutes an axial extension of the inner face of a respectively one of the splined grooves 26, 26' in the bore 24, while the outer face of each straight portion has a profile in the form of an arc of a circle and constitutes an axial extension of the outer face of the cylindrical portion 22.

The ring portion 34 has two thickened portions 341 (see FIG. 4), extending outwardly in two positions which are diametrically opposed to each other and offset by 90° with respect to the connecting elements 14*a* and 14*b*. Two slightly concave recesses 342 are formed in the respective outer surfaces of the portion 341. The ring portion 34 also has two further thickened portions 343, again extending outwardly and lying at the level of the connecting elements 14*a* and 14*b*, in such a way as partially to trap the anchor lugs 1241. Each of these portions 343 again has a recess 344 (FIG. 2), enabling the offset holes 1242 to be left.

The formation of the ring portion 34 during the moulding step enables the slip ring unit 1 to be stiffened in the region of the connection element 14*a* and 14*b*, while at the same time guaranteeing that their distance apart in the radial direction is properly set. In this connection, the presence of the cooling fan of the alternator not far from the connecting elements 14*a* and 14*b*, after the unit 1 has been force-fitted on to the alternator shaft, makes it necessary to position these elements in a very precise way in the radial direction. In addition, the ring portion 34 satisfactorily prevents any contact occurring between the elements 14*a*, 14*b* and an adjacent widened portion of the alternator shaft AR (see FIG. 9) around which the ring portion is positioned, especially when any dilatation effects are taking place due to heating or the accumulation of dust in that region of the alternator.

In addition, the plastics material to be moulded onto the metallic parts of the unit 1 is preferably injected into the mould in the region of the ring portion 34, and in particular in the region of the thickened portions 341 of the latter.

Furthermore, the concave surfaces 342, which are disposed laterally and in diametrically opposed relationship, serve to enable the component to be gripped by an automatic assembly machine, for the purpose of force-fitting the slip ring unit on the alternator shaft. Thus the slip ring unit can be picked up in two possible orientations, offset from each other by 180°. It has been explained above how the notches 30, 30' and 30" enable this orientation to be positively chosen to be such that it is suitable for the energisation of the winding in the correct polarity.

It will also be noted that the shoulders 323*a* and 323*b*, which project radially outwardly from the cylindrical surface defined by the cylinder 10 and its insulating extension 22, serve, during the assembly of the component on certain types of alternator, as an axial abutment for a ball bearing which is arranged between the shaft of the alternator and its casing, so as to constitute the rear bearing of the alternator.

FIGS. 10 and 11 show a component in the form of a slip ring unit of the kind described above, mounted respectively on two alternators A of different models. The alternator shaft is indicated at AR, and a rolling bearing for this shaft is indicated at R. From FIGS. 10 and 11, the function of the ring portion 34 will be understood, in that it prevents any "floating" of the connecting elements 14*a* and 14*b*, and also prevents any likelihood of short circuits occurring with the closely adjacent portions of the alternator.

It will also be noted that a lateral plate P of the rolling bearing R is in abutment against the shoulders 323*a* and 323*b* defined by the body of the component 1.

The present invention is of course in no way limited to the embodiment described above and shown in the drawings, and the person skilled in this technical field will be able to apply to it any variation or modification in accordance with the spirit of the invention.

What is claimed is:

1. A slip ring unit, for force-fitting on an alternator shaft and having electrically conductive elements and insulating material molded over said conductive elements so as to encapsulate the conductive elements, comprising a generally cylindrical body having an outer surface, two slip rings in the generally cylindrical body at said outer surface, two electrical connecting elements, each connected to one of said slip rings, for connection of the slip ring unit to wire ends of a winding of the alternator, with a body defining a bore for accommodating an alternator shaft, the insulating material defining an extension thereof beyond one of the slip rings at an end of the slip ring unit at which a fitting force is to be exerted, wherein said extension defines at least one notch through its entire axial thickness so as to expose one side of an adjacent slip ring, whereby the fitting force can be exerted directly on said slip ring through said notch.

2. A slip ring unit according to claim 1, wherein said at least one notch includes at least two notches, formed through an entire axial thickness of said extension and arranged with an asymmetry of revolution over 180°, in place of jigs for angular positioning of the slip ring unit in an orientation selected from two possible orientations offset by 180° from each other.

3. A slip ring unit according to claim 2, having three notches spaced apart by 120°.

4. A slip ring unit according to claim 3, defining two diametrically opposed spline grooves in said bore, with one said notch being aligned angularly with one of the spline grooves.

5. A slip ring unit according to claim 1, wherein the or each said notch is formed through a radial width of said extension.

6. An alternator with a slip ring unit according to claim 1 fitted on said alternator shaft.

7. A slip ring unit, for force-fitting on an alternator shaft and having electrically conductive elements and insulating material molded over said conductive elements so as to encapsulate the conductive elements, comprising a generally cylindrical body having an outer surface, two slip rings in the generally cylindrical body at said outer surface, two electrical connecting elements, each connected to one of said slip rings, for connection of the slip ring unit to wire ends of a winding of the alternator, with a body defining a bore to accommodate an alternator shaft, the insulating material defining an extension thereof beyond one of the slip rings at an end of the slip ring unit at which a fitting force is to be exerted, wherein said extension defines three notches through its entire axial thickness so as to expose one side of an adjacent slip ring, whereby the fitting force can be exerted directly on said slip ring through said notch, said three notches spread apart by 120° and arranged with an asymmetry of revolution over 180°, in place of jigs for angular positioning of the slip ring unit in an orientation selected from two possible orientation offset by 180° from each other, said slip ring unit defining two diametrically opposed spline grooves in said bore with one said notch being aligned angularly with one of the spline grooves.

* * * * *